Feb. 10, 1942.                  C. HERZOG                    2,272,869
                           ELECTRODE MANUFACTURE
                           Filed Dec. 30, 1939
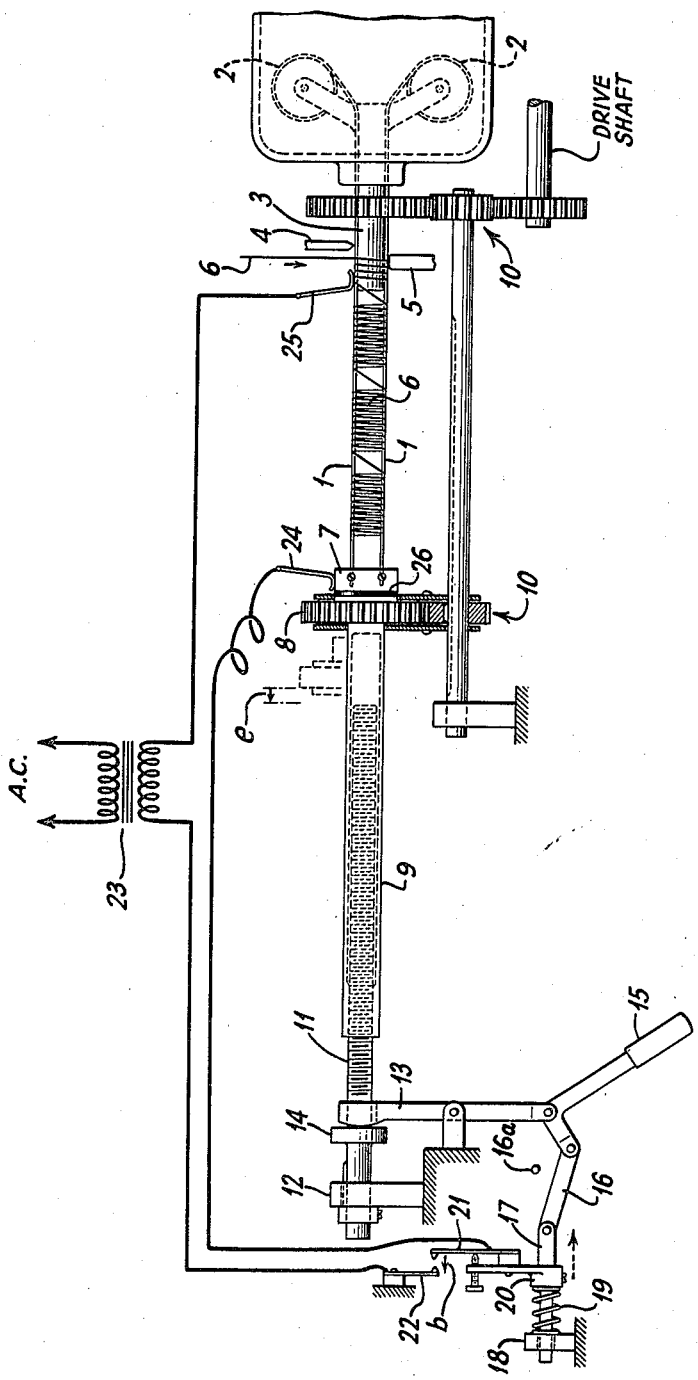
                                              INVENTOR.
                                             CARL HERZOG
                              BY
                                             Charles McClair
                                              ATTORNEY.

Patented Feb. 10, 1942

2,272,869

UNITED STATES PATENT OFFICE 2,272,869

ELECTRODE MANUFACTURE

Carl Herzog, Belleville, N. J., assignor to Radio Corporation of America, a corporation of Delaware Application December 30, 1939, Serial No. 311,781

2 Claims. (Cl. 140—71)

My invention relates to the manufacture of grid electrodes, particularly grids of the type having grid wires attached to support or side rods.

One of the common types of grid comprises a coil of fine grid wire with each turn of the coil supported upon one, two or more support or side rods. Each turn is attached to the side rods either by spot welding or by notching the side rods for each turn and peening or swaging the metal at the edges of the notch while the grid wire lies in the notch. It has been found that in grids so made either the heated or cold worked portions of the side rods, which are usually relatively light weight wire, are strained, so that the rods tend to distort and bend, and thus render the grid unsuitable for radio tubes where accurate spacing of electrodes is important.

The object of my invention is improved means for and methods of making wire grids which are straight and substantially free from strains.

For the purpose of this description, a grid is shown of the wire wound type comprising a wire helix wound on side rods. Each turn of the helix is attached to the support rods by notching the rod for each turn, reeling the wire into the notch and then peening over the metal to hold the turn in its notch. The machine for making the grid is of the lathe type commonly used in grid making in which the side rods are drawn longitudinally by a lead screw over a rotating mandrel that carries the side rods successively under a notching tool and a peening tool, the grid wire being wound onto the mandrel and into the notches ahead of the peening tool. Alternatively, each turn of the grid wire may be spot welded to the side rods by replacing the notching and peening tools with a welding electrode. The lead screw in the machine described draws the side rods longitudinally a distance equal to several end-to-end grids so that a long helix or strip may be removed from the lathe and cut into the desired grid lengths.

According to my invention the side rods of the grids are straightened and freed from strains by heating and stretching the side rods. A predetermined stress, less than the elastic limit or yield point of the side rods at room temperature is applied, and the temperature of the side rods raised until the elastic limit is less than the predetermined stress, so that the side rods stretch to a predetermined extent. This hot working of the metal slightly elongates the grid, and when the temperature is reduced to below the new elastic limit, while the grid is under tension, it assumes a new set with straight side rods. For example, it has been found that when nickel rods .01 to .05 inch in diameter are heated to a temperature of 500° to 750° C. while a pull of several pounds is applied, the rods elongated about 5 percent, and the grid is straightened and is free of the usual twists and bends found in the conventional notched and peened grid. Copper rods should be heated to 350° to 500° C.

The characteristic features of my invention are defined with particularity in the appended claims and one specific example of apparatus for making my improved grid is shown in the accompanying drawing and described in the following specification.

The single figure is a diagrammatic representation of the grid forming machine.

In the particular grid making machine shown, side rods 1 are drawn from reels 2 over rotating mandrel 3 which carries the side rods successively under a notching tool 4 and peening tool 5, grid wire 6 being reeled onto the mandrel and into the notches ahead of the peening tool. As the side rods rotate they advance toward the left, the ends of the rods being gripped in the chuck 7, carried on gear 8 and hollow shaft 9. The mandrel and chuck are mechanically interlocked to rotate at the same speed by a gear and shaft assembly 10, and longitudinal displacement of the chuck and the side rods are provided in the machine shown by a lead screw 11 threaded in the hollow shaft 9. The lead screw 11 is splined or keyed in its bearing 12 so that it will not rotate but is free to slide longitudinally to the left a limited distance. When a strip of grids have been completed and the chuck is at the left end of its run, the side rods may be released from the chuck and cut off adjacent the peening and notching tools and the strip removed, whereupon the clutch may be returned to the right, fastened to the ends of the side rods, and a new strip of grids commenced.

I provide according to my invention means for relieving strains in the swaged sides of the side rods to straighten the grids before they are removed from the lathe. At the end of each run the lead screw is spring loaded to apply a considerable pull to the end of each grid while current is passed through the grid. The heat is sufficient to slightly anneal the side rods and remove strains put in the metal by the notching and peening tools, and the pull is sufficient while the rods are hot to pull them straight. According to one feature of my invention the current is automatically turned off when the side rods have elongated a predetermined amount.

The mechanism for accurately heating and stretching the grid shown in the figure comprises a spring fixed at one end and mechanically connected at its other end to one end of the grid support rods for imparting the strain energy in the spring to the support rod. The particular mechanism for interconnecting the spring 19, fixed at one end against bushing 18, to the lead screw which is attached to the end of the support rod comprises a yoke 13 carried on a fixed pivot at its center and riding at one end on the collar 14 on the lead screw and pivotally attached at its other end to an operating handle 15. The yoke 13 is coupled through a toggle or collapsible link comprising the handle 15 and bar 16 to a spring pressed plunger 17 which slides at one end through a fixed bearing 18 and is biased to the right by spring 19 between bearing 18 and collar 20 keyed to the plunger.

By moving the handle 15 to the left the collapsible link may be straightened against stop 16a and spring 19 compressed so that its tension is applied through linkage 17, 16, 15 and 13 to the lead screw and to the grid side rods 1. The right hand end of the grid may be effectively anchored by bringing the side rods to rest under the notching and peening tools. The tension of the spring is insufficient to stretch the side rods while they are cold, yet sufficient to stretch the side rods while heated.

I provide novel means for turning the heating current on as the spring tension is applied and for interrupting the heating current when the side rods have stretched a predetermined amount. A movable contactor 21 carried on plunger 17 is brought into contact with a stationary contactor 22 when the spring is compressed and the side rods are under tension. The contactors close a circuit through the secondary of power supply transformer 23 connected in series with brushes 24 and 25 at opposite ends of the grid strip. The amount of stretch e of the grid rods may be adjusted by the length of time contactors 21 and 22 are closed, while the plunger 17 is moving to the right and the grid is stretching, by presetting the point in the plunger travel at which the contactors make contact. This presetting is conveniently made by a thumbscrew on contactor 21 to adjust spacing b between the contactors. To prevent short circuiting the power supply through the metal frame of the machine, means is provided to electrically insulate one end of the strip from the machine. The chuck 7 may conveniently be electrically insulated from the machine by clamping the chuck with insulated machine screws to a sheet of insulation 26 between the body of the chuck and the hub of gear 8.

The side rods used in grid manufacture are of relatively light weight metal, usually wire less than .05 inch in diameter. Whether the side rods are cold worked by notching and peening as described above or are crystallized and hardened by spot welding, it is apparent the heterogeneous metal along the side rods will kink, twist and bend the grid, particularly the grids with small side rods. My improved method of straightening grids is equally applicable to the so-called ladder type grid comprising two side rods with a plurality of short parallel grid wires welded at their ends to the side rods.

My improved grid manufacture contemplates means for attaching grid wires to metal side rods with means for heating the side rods and means for longitudinally stressing the side rods while they are heated in combination with means for interrupting the heating when rods have elongated a predetermined amount. My improved means for making grids accurately sizes and straightens the grids.

I claim:

1. In a machine of the character described, the combination of a mandrel, means for drawing a grid support rod along the side of the mandrel and parallel to the axis of the mandrel, a notching tool, a peening tool, the mandrel being rotatable to carry the rod successively under said notching and peening tools, and to wind a wire around said mandrel and draw the wire into notches in the support rod before the notches pass under the peening tool, means for straightening the notched and peened portions of the support rod comprising a spring fixed at one end and mechanically connected at its other end to one end of said support rod for imparting the strain energy in said spring to said support rod, a switch and an electrical power source connected in series with the ends of the notched and peened portions of the support rod, one contact of said switch being connected to and movable by said spring to open and close said switch upon predetermined loadings of said spring.

2. In a machine of the character described, means for attaching a series of convolutions of grid wires to a support wire comprising, in combination, a rotatable mandrel, a lead screw drawing means for pulling a grid support rod along the side of the mandrel and parallel to the axis of rotation of the mandrel, and means for joining each turn of wire, wound around the mandrel and over the support rod, to the support rod; and means for straightening the support rod after a plurality of turns of wire have been joined to the rod comprising means for biasing said drawing means outwardly from the mandrel to stretch the support rod, a switch and an electrical power source connected in series with the ends of the support rod between the mandrel and said drawing means, one contact of said switch being connected to and movable by said drawing means to open said switch upon a predetermined elongation of said support rod.

CARL HERZOG.